United States Patent
Allingham et al.

(10) Patent No.: US 9,796,358 B2
(45) Date of Patent: Oct. 24, 2017

(54) APPARATUS AND METHOD FOR PREVENTING A VEHICLE BEING DRIVEN AWAY FROM A LOADING BAY

(71) Applicant: Castell Safety International Limited, London (GB)

(72) Inventors: Keith Brian Allingham, London (GB); Georgios Papagiannopoulos, London (GB)

(73) Assignee: Castell Safety International Limited, London (GB)

( * ) Notice: Subject to any disclaimer, the term of this patent is extended or adjusted under 35 U.S.C. 154(b) by 0 days.

(21) Appl. No.: 15/077,621

(22) Filed: Mar. 22, 2016

(65) Prior Publication Data

US 2016/0280183 A1   Sep. 29, 2016

(30) Foreign Application Priority Data

Mar. 23, 2015   (GB) .................... 1504884.6

(51) Int. Cl.
*E05B 73/00* (2006.01)
*B60R 25/08* (2006.01)
(Continued)

(52) U.S. Cl.
CPC ............ *B60R 25/08* (2013.01); *B60R 25/001* (2013.01); *B60R 25/044* (2013.01)

(58) Field of Classification Search
CPC ..... B60R 25/00; B60R 25/001; B60R 25/002; B60R 25/003; B60R 25/01; B60R 25/044; B60R 25/08; B60R 25/083; B60R 25/086
See application file for complete search history.

(56) References Cited

U.S. PATENT DOCUMENTS

| 4,226,103 A | * | 10/1980 | Strickland | ............... B60R 25/08 70/14 |
| 4,325,237 A | * | 4/1982 | Menzie | ................... B60R 25/08 280/507 |

(Continued)

*Primary Examiner* — Christopher Boswell
(74) *Attorney, Agent, or Firm* — LeClairRyan, a Professional Corporation

(57) ABSTRACT

The apparatus is a trapped key safety interlock device for use with a coupling that comprises a body provided with a face seal, a rim on one side and a projecting spur on the diametrically opposite side. The safety device includes a coupling part (201) which is complimentary to the said coupling (102) and which comprises a body portion having a rim portion (207) on one side for engagement with the spur of the said coupling and having a spur portion (206) on the diametrically opposite side for engagement with the rim of the said coupling (102). The rim portion accommodates a release mechanism (16, 18) for selectively enabling and disabling a key retention mechanism within the device. The key retention mechanism has a key retention condition and a key releasable condition, wherein the release mechanism comprises a primary release mechanism (16) and a secondary latching mechanism (18) resisting movement of the primary release mechanism until it is actuated itself. The method uses this apparatus as the safety device can prevent a vehicle releasably attached to a loading bay by the safety interlock device from being driven away from the loading bay until released using the safety interlock's release procedure.

20 Claims, 11 Drawing Sheets

(51) Int. Cl.
*B60R 25/044* (2013.01)
*B60R 25/00* (2013.01)

(56) References Cited

U.S. PATENT DOCUMENTS

| | | | | |
|---|---|---|---|---|
| 4,738,126 | A * | 4/1988 | Haberle | E05B 67/36 |
| | | | | 70/14 |
| 5,076,077 | A * | 12/1991 | Renne | B60R 25/08 |
| | | | | 70/14 |
| 5,129,243 | A * | 7/1992 | Kassebaum | B60T 17/043 |
| | | | | 303/69 |
| 5,239,848 | A * | 8/1993 | Nichols, Jr. | B60T 17/043 |
| | | | | 285/80 |
| 5,410,894 | A * | 5/1995 | Fox | B60R 25/08 |
| | | | | 138/89 |
| 7,552,606 | B2 * | 6/2009 | Drummond | B65G 69/003 |
| | | | | 70/14 |
| 8,052,172 | B1 * | 11/2011 | Junior | B61G 5/08 |
| | | | | 285/69 |

* cited by examiner

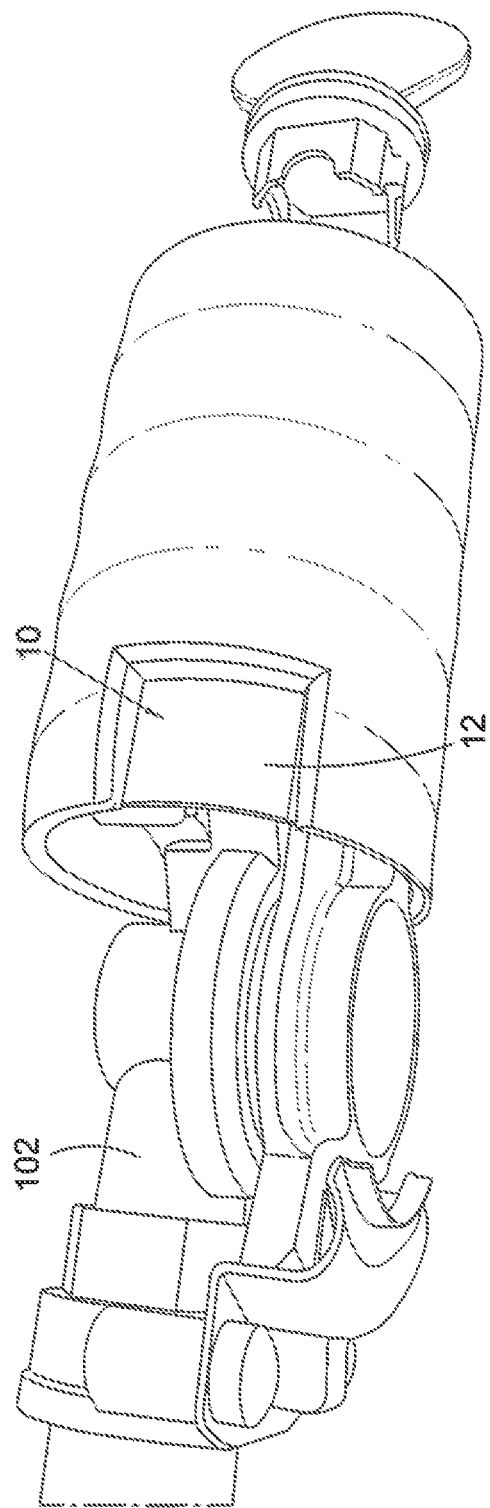

APPARATUS AND METHOD FOR PREVENTING A VEHICLE BEING DRIVEN AWAY FROM A LOADING BAY

This application claims the benefit of United Kingdom Patent Application Serial No. 1504884.6, filed Mar. 23, 2015, which is hereby incorporated by reference in its entirety.

FIELD OF THE INVENTION

This invention relates to an apparatus for preventing a vehicle from being driven away from a loading bay during loading/unloading, and a method for the same purpose.

BACKGROUND OF THE INVENTION

The normal sequence of events at a loading bay is that a vehicle (a semi-trailer, a drawbar trailer, or a lorry) is driven up to a loading bay and the driver contacts staff in the building. The staff then open the loading bay for the driver.

The loading bay has a door, usually of the 'up and over' type, and a dock leveler. The dock leveler is a powered ramp which is adjusted in height to accommodate differences in vehicle loading heights and to enable forklifts to drive from the building into the vehicle.

There is a risk that if the trailer is allowed to pull away or move prematurely from these loading bays then the forklift could fall from the dock leveler. To prevent such accidents, or simply to prevent such premature vehicle departures, several safeguards are currently employed. These systems include:

a) Traffic lights, some of which are linked to the dock leveler. This does not prevent the driver from moving off but relies upon him obeying the lights. These systems are quite expensive.

b) A traffic barrier system which retains the vehicle at the loading bay until a barrier is raised. This also relies upon correct procedure and is expensive.

c) An inbuilt wheel blocking device which is installed in the ground at each bay and which is raised to prevent the vehicle from leaving until loading is complete. This is very expensive and also relies upon correct procedure to be effective.

d) A wheel clamp which is fitted when the vehicle arrives and which provides a physical and visual barrier to indicate to the driver and he/she should not drive off. This also relies upon procedures and is cumbersome to operate.

e) A trapped key safety interlock which actively prevents the vehicle from being driven away from a loading bay during loading/unloading, the apparatus comprising a safety device which is complementary to a coupling on the vehicle and which when fitted to the coupling prevents the vehicle from being driven away, e.g. by causing the air supply for the trailer's air brakes to be maintained in a fail (disconnected) condition—a condition in which the brakes are automatically engaged. Such a safety device is disclosed in, for example, EP1493620, the whole contents of which are incorporated herein by way of reference.

The trapped key safety interlock system includes a locking device which is operable to prevent removal of the safety device from the coupling and which prevents removal of a key from the locking device until the locking device is so operated. Only then can the released key be used to operate a device, such as a switch or a door lock, to enable the use of a loading bay.

This safety device system then further prevents removal of the key from the switch or door lock until that is operated to disable use of the loading bay (since a corresponding key interlock mechanism is provided at that location too). Therefore, only once the loading bay is disabled can that key be removed therefrom for then again unlocking the earlier mechanism that is causing the trailer's braking system to be engaged.

This trapped key safety interlock system has now been widely adopted, but a potential breach of its interlock can occur if a user manually interferes with the internal locking mechanism of the device before locking it onto the trailer's coupling, thus freeing the key either without first engaging the vehicle's braking system or without first disabling the loading bay.

The present invention therefore looks to provide a tamper resistant version of trapped key safety interlock.

SUMMARY OF THE INVENTION

The present invention provides a trapped key safety interlock device for use with a coupling that comprises a body provided with a face seal, a rim on one side and a projecting spur on the diametrically opposite side, the safety device including a coupling part which is complimentary to the said coupling and which comprises a body portion having a rim portion on one side for engagement with the spur of the said coupling and having a spur portion on the diametrically opposite side for engagement with the rim of the said coupling, the rim portion accommodating a release mechanism for selectively enabling and disabling a key retention mechanism within the device, the key retention mechanism having a key retention condition and a key releasable condition, wherein the release mechanism comprises a primary release mechanism and a secondary latching mechanism resisting movement of the primary release mechanism until it is actuated itself.

Preferably the device comprises a key releasably locked within it. The key might instead be released but releasably lockable within it. The device might then be mounted on the coupling.

Preferably the secondary latching mechanism comprises a sprung member.

It is preferably located such that it is engaged by the spur of the coupling before the primary release mechanism.

Preferably the secondary latching mechanism comprises a sprung plate. The sprung plate may be indirectly acted upon by the spur, such as via a captured ball bearing (a ball bearing behind a smaller hole). The ball bearing should preferably be acted upon by the spur of the coupling before the primary release member.

Preferably the sprung plate is a split sprung plate, having two separately moveable components. Preferably each component underlies a ball bearing. Both ball bearings can thus then be acted upon by the spur. Preferably only one of them pushes down a release mechanism to release the primary release mechanism.

Preferably the primary release mechanism is a pivotal release mechanism. However, it might instead slide.

Preferably it is sprung into a non-releasing condition, thus ensuring the key is trapped until released.

Preferably the primary release member is a pivotal latching member. It is preferably mounted on a pivot pin.

Preferably the primary release member has a latch on an underside of it. The latch might be on a projecting foot or extending member of the primary release member.

The primary release member preferably has a flange towards its rear for moving into or out of engagement or alignment with a stub of a rotatable member—rotatable using the key. The flange is moved upon actuation of the primary release member into a position that allows rotation of the rotatable member.

Preferably the safety device has an outer casing. Preferably the outer casing is fixed relative to the coupling part. It might be removable for servicing purposes.

Preferably the key is arranged to operate an inner sleeve or inner element relative to the outer sleeve to close a port or window provided in the outer sleeve when the key is rotated into a key release condition. The inner element might be a door. Preferably the door is made of metal to resist tampering.

The invention also provides a method of preventing a vehicle from being driven away from a loading bay during loading/unloading, comprising the sequential steps of:

applying to a vehicle at a loading bay a safety device which prevents the vehicle from being driven away from the loading bay;

locking the safety device to prevent removal of the safety device, by means of a key which is prevented from being removed from the safety device until the safety device is locked;

removing the key from the locked safety device; and using the key to enable use of the loading bay, thus simultaneously trapping the key in a second interlock mechanism so that it cannot be used to unlock the safety device, the key remaining so trapped until it is used to disable use of the loading bay, the safety device being the trapped key safety interlock device described above.

BRIEF DESCRIPTION OF DRAWINGS

The invention will now be described in further detail, by way of example only, with reference to the accompanying drawings, in which:

FIG. 18 shows the locked safety device on the coupling, with the key removed and the door closed.

DETAILED DESCRIPTION OF THE INVENTION

Figure 1:
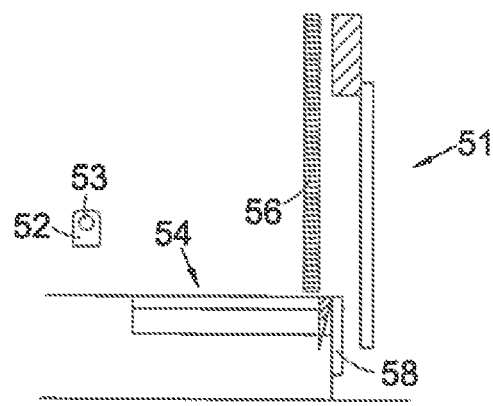
FIG. 1 is a schematic side view of a loading bay.
Figure 2:
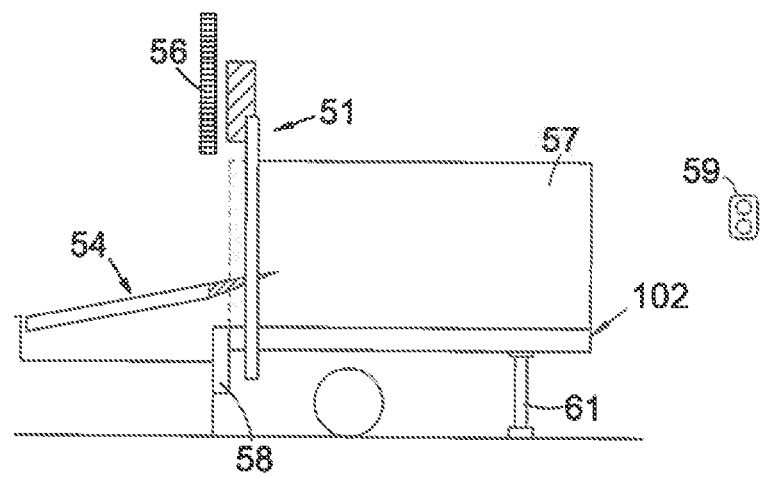
FIG. 2 is a schematic side view of the loading bay in use with a trailer unit.
Figure 6:
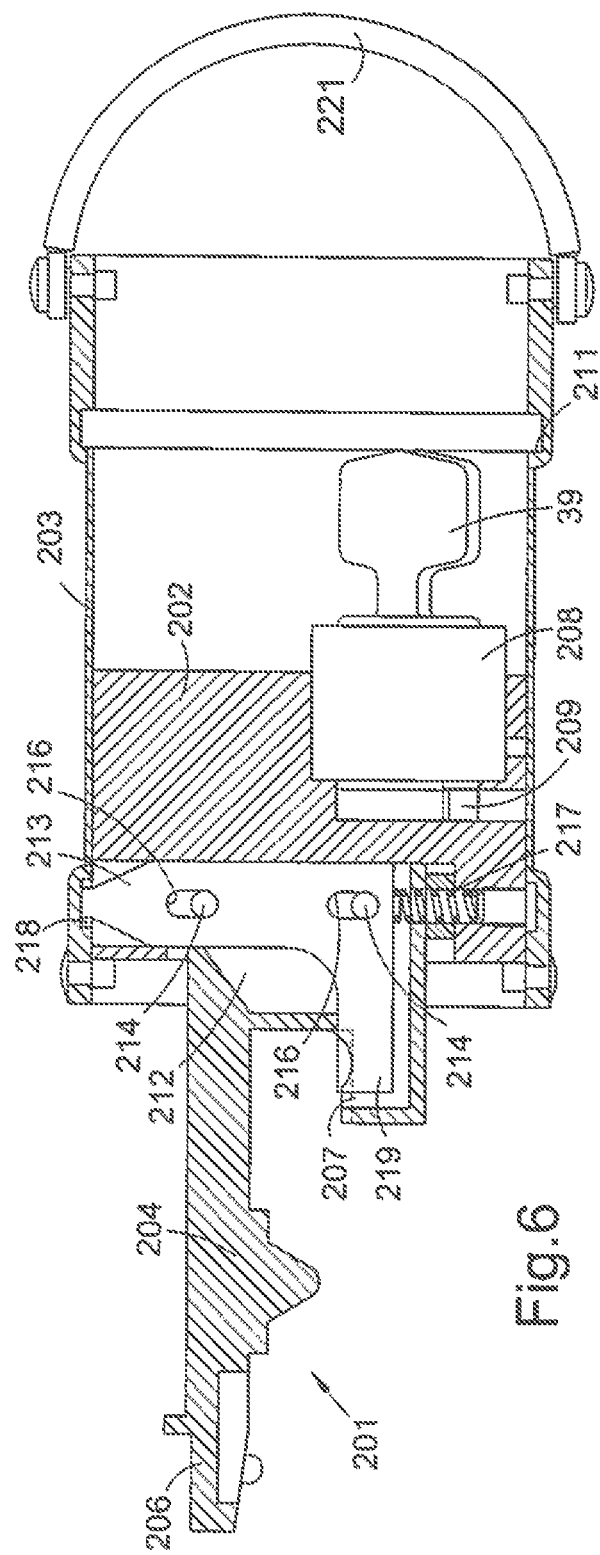
FIG. 6 is a longitudinal section through a prior art safety device as described in EP1493620, for use with the type of coupling shown in FIGS. 4 and 5, before fitting to the glad hand coupling.
Figure 7:
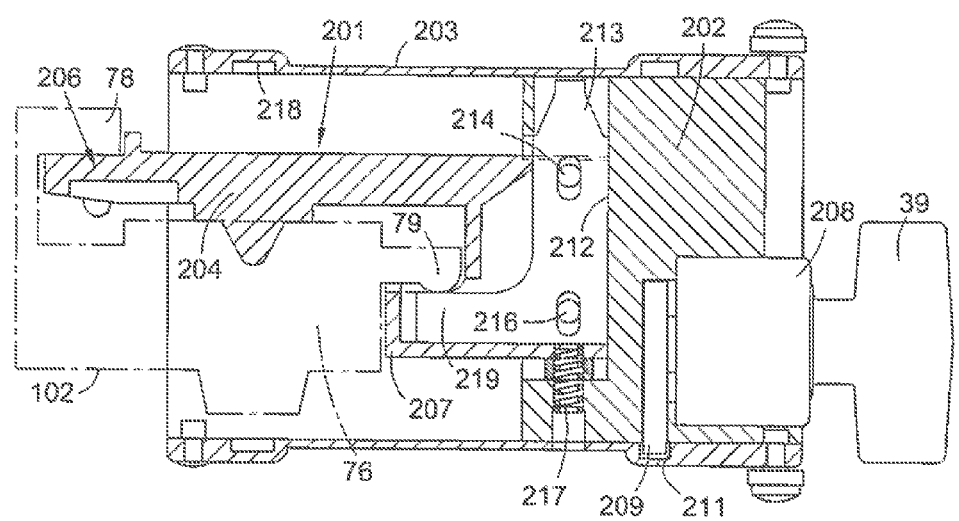
FIG. 7 is a longitudinal section through the safety device of FIG. 6 after the safety device has been fitted to the glad hand coupling and a key has been turned to lock the safety device.
Figure 8:
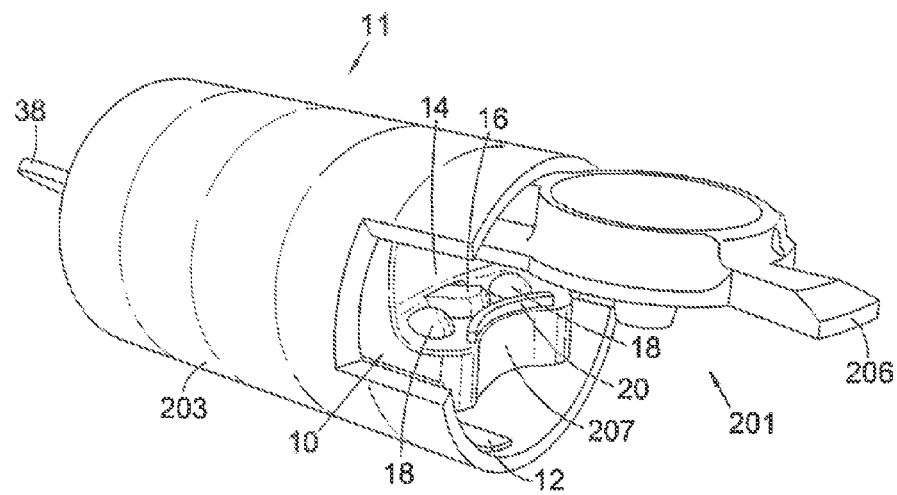
FIG. 8 shows a perspective view of a preferred embodiment of safety device of the present invention.

Referring first of all to FIGS. 1 and 2 there is shown a schematic view of a loading bay 51 including a switching device 52 for selectively enabling and disabling the use of the loading bay, the switching device including a lock 53 that is operable by a key 39 from a safety device such as an interlock device (see FIGS. 6 and 7 for a prior art device and FIG. 8 onwards for a device according to the present invention).

The switching device 52 will be a standard key interlock mechanism, and as such the key 39 will become trapped by the lock 53 upon activation of the loading bay until the lock is turned again to disable use of the loading bay 51.

One way of enabling/disabling the loading bay is for this switching device 52 to enable and disable a drive or power source for operating a dock leveler 54.

Figure 4:
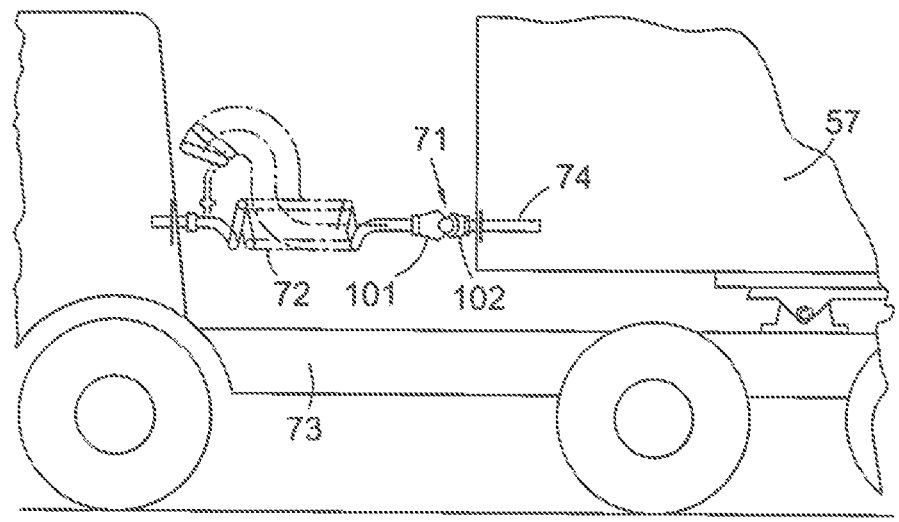
FIG. 4 is a schematic side view of part of an articulated vehicle, showing thereon a standard "glad hand" or "palm" coupling assembly.
Figure 5:
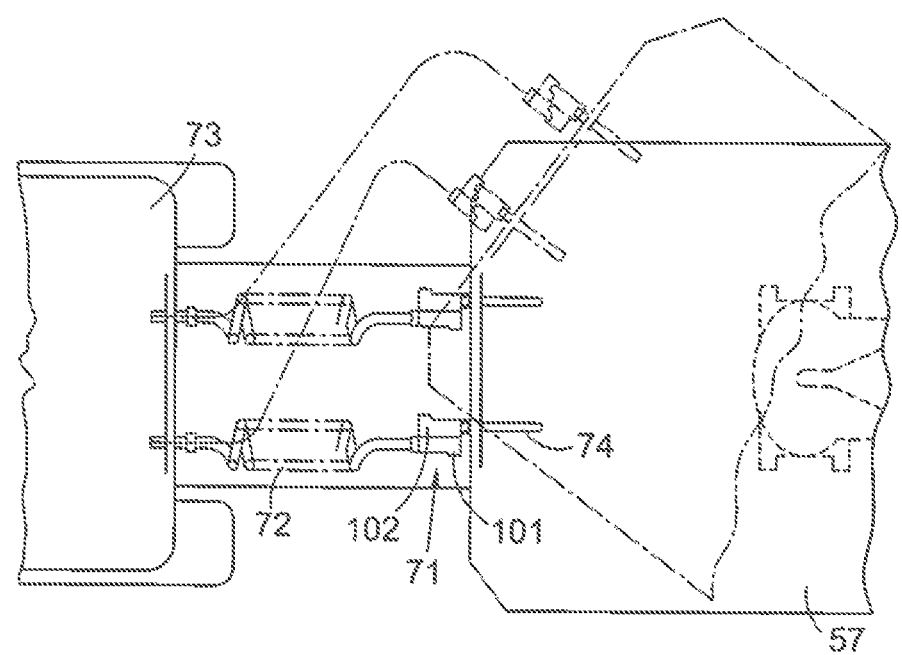
FIG. 5 is a plan view corresponding to FIG. 4.

Referring then to FIGS. 4 and 5, coupling assemblies fitted in the air supply for trailer braking systems allow air under pressure to be supplied to the brake system of the trailer to release a braking device on the trailer unit of an articulated vehicle. In the event that the air supply fails, the braking device is automatically engaged to prevent movement of the trailer unit (or to brake the moving trailer unit).

A preferred procedure for loading a trailer unit 57 (FIG. 2) using the above-described safety device 11 will now be described:

1) The driver of the articulated vehicle with the trailer unit 57 arrives in the vicinity of the loading bay 51 and reverses towards the dock leveler 54. The driver gets out of the tractor unit, walks to the back of the trailer unit 57, and opens its doors.

2) The driver contacts a warehouse operative, who walks back to the tractor unit with the driver, bringing with him a safety device in which the key 39 is trapped. That key will have been removed from the thereafter disabled switching device 52, and it is retained in the safety device by a key retention device, such as that of any of FIGS. 6 to 18.

3) The driver then reverses the vehicle further until the trailer unit 57 is at the loading bay 51 (preferably in contact with a buffer 58), unless of course it was already so positioned.

4) The driver then disconnects a "glad hands" coupling 71 (FIGS. 4 and 5) between the trailer and the tractor/cab, thereby disconnecting the brake supply line for his vehicle/trailer, with the result that the brakes of the trailer unit 57 engage, or lock on.

5) The warehouse operative then fits the safety device onto the appropriate half 102 of the glad hands coupling 71 and turns the key 39 to secure the safety device onto the coupling 102, and removes the key 39, thereby preventing removal of the safety device until the key is reapplied and turned. Re-connection of the air supply to the emergency braking device (the only way to release the brakes) is thus prevented.

6) The operative then inserts the key 39 into the lock 53 of the switching device 52 and turns it. This enables operation of the dock leveler 54. (In addition, this may enable operation of the bay door 56 and/or turn a traffic light 59 from green to red.)

7) Loading or tipping then commences. Meanwhile, the tractor unit of the vehicle can be driven away, if desired.

In the example shown in FIG. 2 the trailer unit 57 is a semi-trailer, which is temporarily supported by a frame 61.

8) When loading or tipping has been completed, the switching device 52 is turned off and disabled by turning the key 39, which is then released from the lock 53 and can be used to unlock the safety device 11 from the coupling at the trailer. Removal of the safety device 11 from the coupling 102 then allows the air supply to be reattached to the brakes, thus releasing the emergency brake and thus allowing the trailer unit 57 to be driven away.

Figure 3:
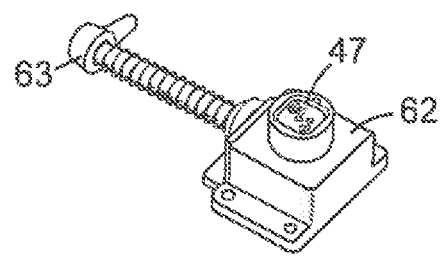
FIG. 3 is a perspective view of a door lock for the door of a loading bay.

In the preferred embodiment the switching device 52 utilises a so-called figure lock, which is a commercially available product in which a rotatable central member has raised symbols 47. See FIG. 3. These mate with the key 39 which has an engraved form matching the symbols. When the central member is rotated by the key 39 to the unlocked or operation position, the key 39 is trapped in the lock 38. When the central member 46 is rotated by the key 39 to the position corresponding to the key release position, the key 39 can be released from the lock 38 and is therefore free for use with the safety device for locking on the brakes of the trailer.

A similar figure lock is provided on the safety device.

Other key or lock forms are also useable with this system, such as conventional keys, albeit fitted with mechanisms for interlocking to the lock unit.

The switching device 52 shown in FIG. 1 could be replaced by a door lock 62 (FIG. 3) which is operable by the key 39 and which has a bolt 63 for securing the door 56 of the loading bay 51. The key 39 cannot be released from the door lock 62 until the key 39 has been turned so as to secure the door 56, thereby disabling the loading bay.

In another embodiment the door lock may trap a second key, which is released when the first key 39 is turned to unlock the door and which can only then be used to operate an electrical switch, e.g. controlling the supply of power to the dock leveler 54. This could be a second key—different to the first, thus preventing the key for operating the dock leveler being released to the driver, even in a secured state, until the brakes are locked on.

Alternatively, the door lock may be combined with such a switch.

In another embodiment the key 39 may be used to operate a lock on a communication box providing communication through a wall separating the inside of the loading bay from the outside. The driver inserts the key 39 in the external lock and turns it, thereby trapping the key 39. This action is communicated (electrically or mechanically) to an internal lock, which thereupon releases a second key, for use by an operator in the loading bay, thereby enabling use of the loading bay. The first key (39) remain trapped until the operator inserts the second key into the internal lock and turns it, thereby trapping the second key. This procedure obviates direct contact between the driver and the operator.

The standard coupling assembly 71 shown in FIGS. 4 and 5 is (according to International Standard ISO 1728) in the supply line (emergency line) which supplies air under pressure to release the braking device on the trailer unit 57. The assembly 71 comprises a first coupling 101 on the end of a flexible hose 72 extending from the tractor/cab. It constitutes a first supply line section on the tractor unit 73. A second coupling 102 on the end of a second supply line section 74 is provided on the trailer unit 57.

Each coupling 101, 102 comprises a body 76 carrying a face seal. One of these bodies is shown in dotted lines in FIG. 7—the one 102 on the trailer's pipe. Another is shown in FIG. 14 onwards, again the one 102 on the trailer's pipe.

The two couplings 101, 102 are connected by placing their face seals in mutual contact and rotating them about their common axis until a spur 79 of each coupling engages under a rim 78 of the other coupling so that the face seals are clamped hermetically together. The relative motion of the complementary couplings 101, 102 resembles the rotation of one hand palm against the other, so this type of coupling is commonly referred to as a "palm" coupling or a "glad hand" coupling.

FIGS. 6 and 7 show a prior art safety device of this type. It comprises a coupling part 201 which is complementary to the second coupling 102 (described above) and projects in the axial direction from a generally cylindrical inner part or body 202 which is surrounded by a generally cylindrical outer part or sleeve 203. The coupling part 201 comprises a body portion 204 shaped so as to be complementary to the body 76 of the second coupling 102, a spur portion 206 for engagement with the rim 78, and a rim portion 207 which is to engage the spur 79 and which is connected to the inner body 202.

The outer sleeve 203 is axially slidable relative to the inner body 202 between a first position (FIG. 6), in which the coupling part 201 is exposed for connection to the coupling 102, and a second position (FIG. 7), in which the sleeve 203 covers the body part 204 (and also the body 76 of the coupling 102) to prevent disconnection of the coupling part 201 from the coupling 102.

The inner body 202 carries a figure lock 208 operated by a key 39 as described above. The lock 208 has a locking member 209 which is rotatable (by rotation of the key 39) between a locking position in which it engages in an annular internal recess 211 in the sleeve 203 to retain the sleeve in its second position (FIG. 7), and an unlocking position (FIG. 6). In the latter position the key 39 is trapped in the lock 39. Furthermore, the sleeve 203 when in its first position (FIG. 6) hinders access to the trapped key 39 and also interferes with the key 39 so as to prevent it from being turned to a position in which it is free.

The inner body 202 and the coupling part 201 define a diametral slot 212 which accommodates a latching plate 213 guided and retained by pins 214 engaging in elongate cut-outs 216. The plate 213 is urged by a compression spring 217 into a latching position (FIG. 6) in which it engages in an annular internal recess 218 in the sleeve 203 in the first position, thereby preventing the sleeve from being moved to the second position (FIG. 7), which would allow the key 39 to be freed. When the coupling part 201 is connected to the coupling 102, the spur 79 acts on an extension 219 of the latching plate 213 so as to move the plate 213 out of engagement with the recess 21, thereby allowing the sleeve 203 to be moved to its second position (FIG. 7).

The sleeve 203 is provided with a carrying handle 221 which is pivotable between the positions shown in FIGS. 26 and 27 respectively. The sleeve 203 is freely rotatable about its own axis relative to the inner body 202, in both the first position (FIG. 6) and the second position (FIG. 7).

The above mechanism is modified by the present invention so as to prevent the key's removal being achievable on a non-fitted safety device (with a locked-in key) simply by pushing a finger through an open front end and depressing the extension 219 of the latching plate 213. This is achieved by adding a secondary latching member within the rim portion that has to be actuated prior to the extension itself being depressible.

Referring now to FIGS. 8 to 18, a preferred embodiment of the present invention is described.

As can be seen, as with the previous safety device, this safety device comprises a coupling part 201 which is complimentary to a glad hands coupling 102 (see FIGS. 14 to 18) and which project in a generally axial direction from a generally cylindrical outer casing or outer part 203. In this embodiment, however, the outer part or casing 203 is fixed relative to the coupling part 201, rather than being slidable when released.

The outer part 203 has a window 10 which can be opened or closed by an internal door 12, which door is operated by a key 38, which key in this embodiment is as per the previous embodiments. Keys other than figure keys may instead be used, as before.

The window 12 allows the safety device 11 to be fitted onto the second coupling 102 since the window aligns with an area 14 above a rim portion 207 of the safety device's coupling part 201.

The safety device 201 further has a spur portion 206 much as in the previous product.

The rim portion 207 is also now modified to comprise not just a latching plate 213, but also a secondary latching member 18. In this instance the latching plate is replaced by a pivotal latching member 16. The secondary latching member 18, however, is linearly actuated instead. It might instead be rotatable or pivotable.

The secondary latching member 18 is provided to resist activation of the pivotal latching member 16 until it has itself been interacted upon by the rim of the second coupling 102.

The secondary latching member 18 is shown to comprise a ball bearing in FIG. 8. There is a second ball bearing 18 as well. Only one of these are operational in this embodiment. The other is a dummy and provides no release function. However, by providing it, it provides symmetry to the appearance of the product. It further provides a bearing surface over which the spur of the second coupling can more easily glide, thus assisting with the smoothness of operation of the product thereon.

Also for providing a smoothness of operation, an upstanding arcuate flange 20 is also provided—it provides a further support surface for the spur of the second coupling.

The operational secondary latching member 18 is the one closer to the window in this embodiment. This can be more clearly seen in the breakaway views of FIG. 10 onwards.

Figure 9:
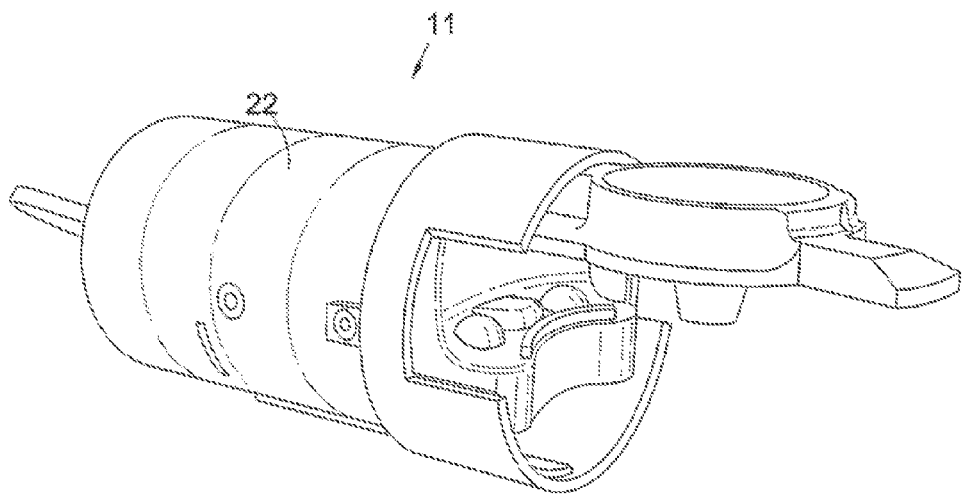
FIG. 9 shows the embodiment of FIG. 8 with the outer cover removed.

Referring first, however, to FIG. 9, a further view of the safety device 11 is provided, but this time with the outer part 203 removed. It is now possible to see an inner casing 22. This inner casing houses and retains, via various bolts or screws or pins, the internal workings and body of the safety device. It too is fixed relative to the rim portion and spur portion.

Figure 10:
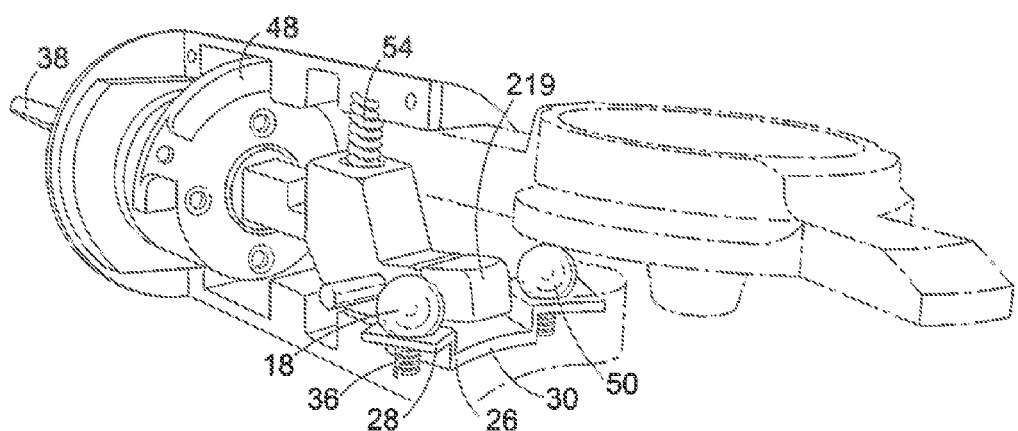
FIG. 10 shows an internal cutaway view of the preferred embodiment showing a modified trigger or pivotal latching member.
Figure 11:
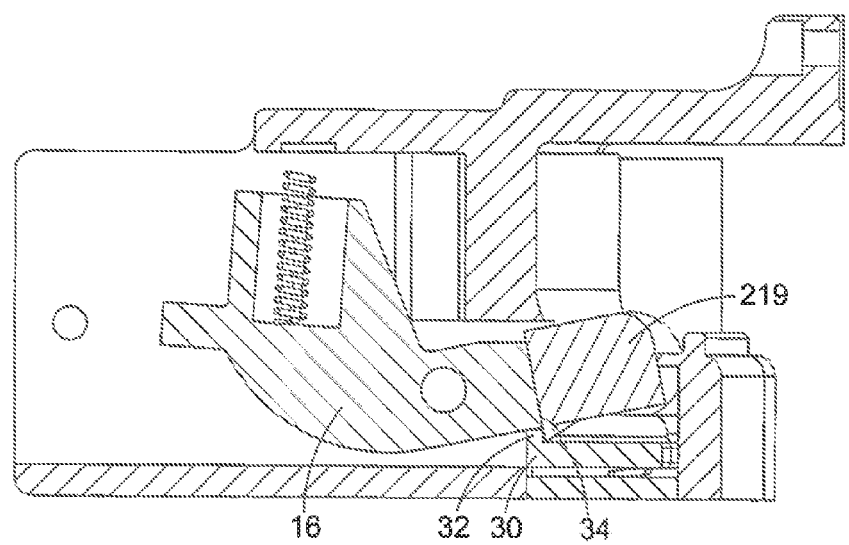
FIG. 11 shows a sectional side view of the trigger and its associated secondary latching member.
Figure 12:
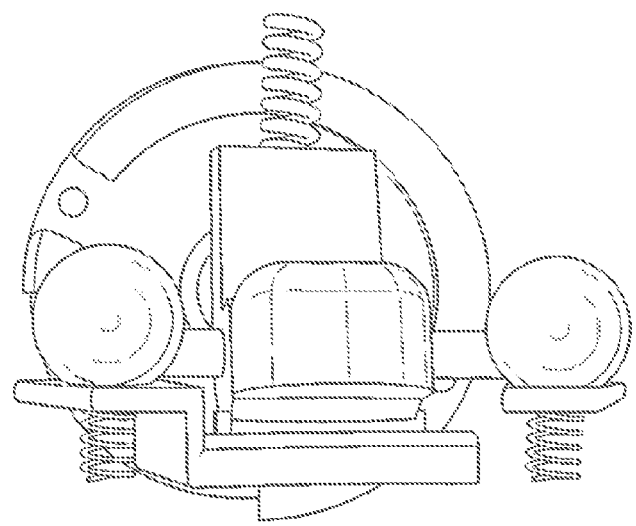
FIG. 12 shows a front elevation of the new trigger.
Figure 13:
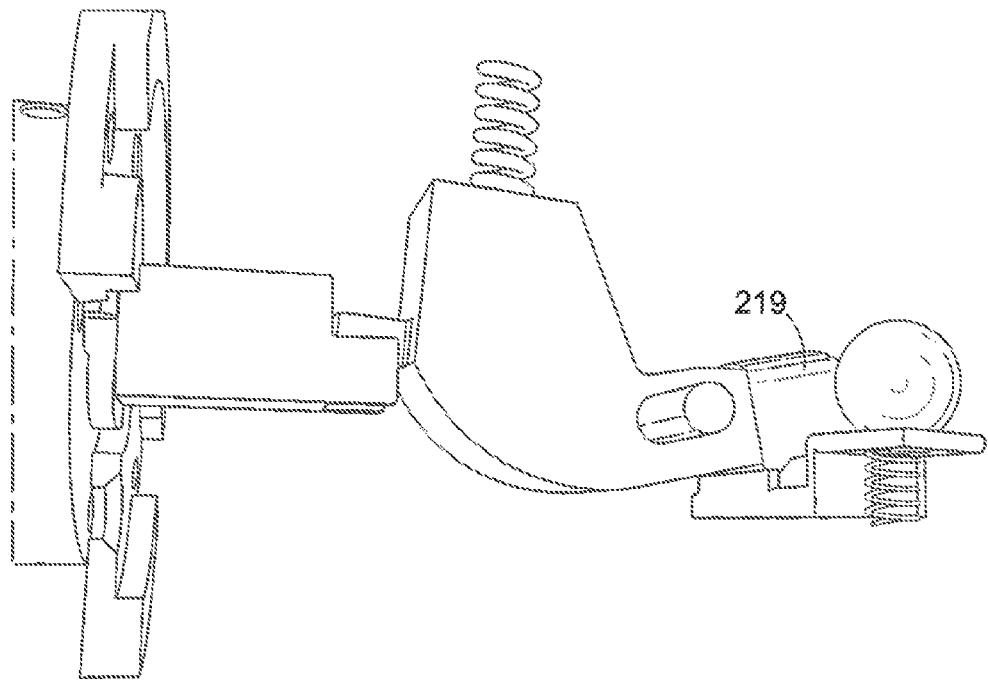
FIG. 13 shows a reverse side perspective of the trigger, showing an interaction of the back of the trigger with a stub of a key activated turnable mechanism—linked to a door of the safety device.
Figure 14:
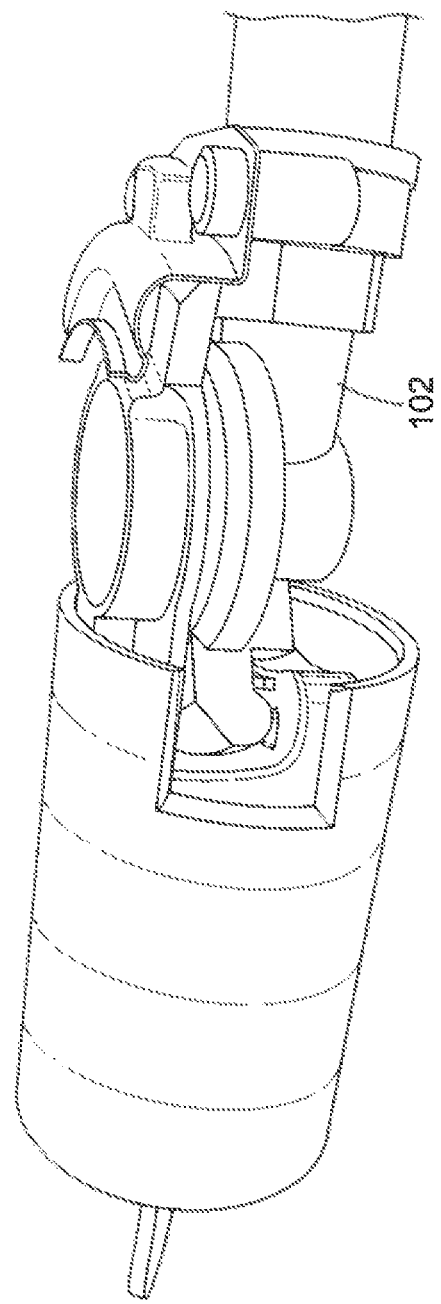
FIG. 14 shows the new safety device being connected onto a coupling of a trailer.
Figure 15:
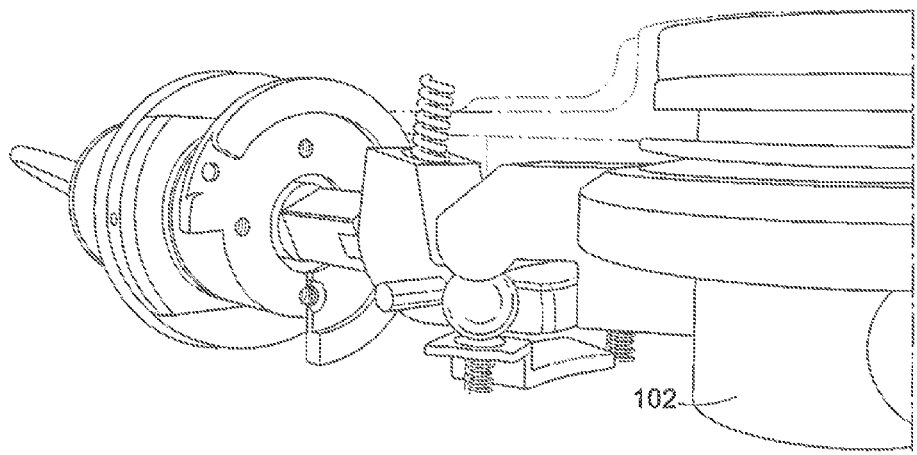
FIG. 15 shows a cutaway view of the coupling and safety device from a different angle.
Figure 16:
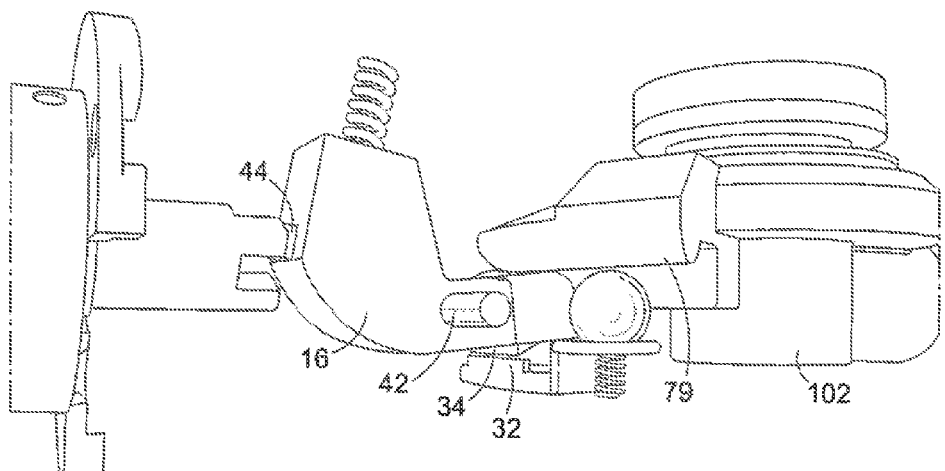
FIG. 16 shows the engagement with the coupling almost complete, again in cutaway view.
Figure 17:
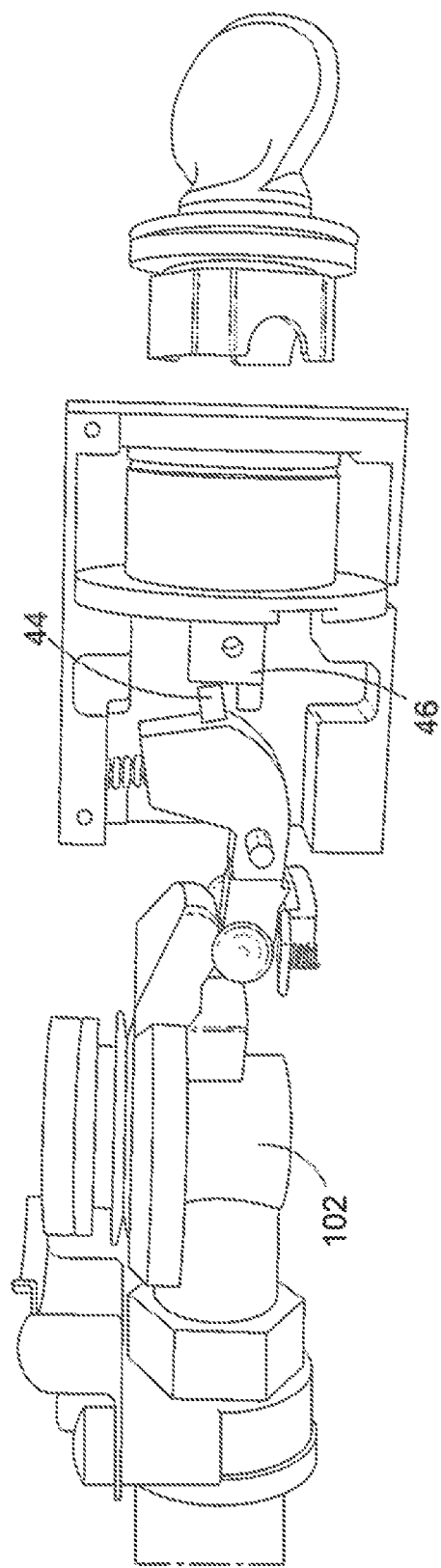
FIG. 17 shows the arrangement once the key has been turned and removed from the safety device, again in cutaway view.

Referring next to FIG. 10, as can be seen the functional secondary latching member 18 has a ball bearing 24 mounted on a sprung plate 26. The sprung plate 26 is stepped so as to have a high portion 28 and a low portion 30. The low portion 30, as seen in FIG. 11, has a rearward upstand 32. This rearward upstand 32 is for bearing against a latch 34 of the pivotal latching member 16 so as to prevent actuation of the pivotal latching member 16 until the sprung plate 26 is driven downwards against the spring bias provided by a spring 36 (see FIG. 10). Once it has been pushed downwards by the interaction of the ball bearing against the spur of the secondary coupling 102, as shown in FIGS. 15 and 16, the rearward upstand 32 becomes located below the latch 34 on the base of the pivotal latching member 16. Further insertion of the spur 79 can thus push down the pivotal latching member 16 at its extended end, thus rotating it about its pivot pin 42 for moving a flange 44 at a rear end thereof. This allows the key to turn since it moves the flange out of a blocking engagement with a stub 46 attached to the component that is rotated by the key 38. This thus also then allows the key 38 to rotate the mechanism 48 of the lock to rotate the door 12 across the window 10 when the spur 79 has been fully rotated over the pivotal latching members extended end 219 and perhaps even over the second ball bearing 50.

Once the key has been turned, it is then free to be removed from the safety device for use on, for example, the switch of the loading bay. This then leaves the safety device securely locked onto the coupling 102.

FIG. 18 shows the door closed across that window. Because the door is closed, the safety device can no longer be rotated off the second coupling 102 until the key 38 is reinserted and unlocks the door.

Because of the sprung secondary locking mechanism, e.g. the sprung ball bearings, it is less straightforward to insert something into the safety device to release the pivotal latching member—first the secondary latching member has to be released. The spring tension in the spring 36 for the sprung plate 26 can be made stiff enough to prevent a user using his finger to release the key. Likewise a spring for the pivotal latching member can also be made adequately strong to prevent inadvertent release. That second spring 54 is provided toward the top of the pivotal latching member 16.

The locking sleeve or door is preferably made of hardened steel, or even titanium, to resist attack. Likewise the body and rim/spur portions can be made of metal, such as hardened steel, to ensure they are strong enough to resist attack.

The above-described safety device is of relatively low cost and only requires the fitting of an interlocked switch in the power supply to the dock leveler. Its use ensures that the trailer unit cannot be moved until loading is completed. By physically interlocking the brakes of the trailer unit with the operation of the loading bay, reliance upon procedural compliance is avoided, eliminating the possibility of human error. No modification of the vehicle is required.

Various modifications may be made to the safety device within the scope of the invention as defined by the appended claims. For example, it could be modified to suit other couplings. The safety device might even be used in a brake line other than the emergency line, e.g. in an auxiliary line. Furthermore, the figure lock 38 described above could be replaced by any suitable lock, in particular a high security lock to prevent theft of the trailer unit.

It will also be appreciated that the safety devices described above are applicable not only to articulated vehicles but also to rigid vehicles, with suitable modification of the brake line.

What is claimed:

1. A trapped key safety interlock device for use with a coupling that comprises a body provided with a face seal, a rim on one side and a projecting spur on the diametrically opposite side, the safety interlock device including a coupling part which is complimentary to the said coupling and which comprises a body portion having a rim portion on one side for engagement with the spur of the said coupling and having a spur portion on the diametrically opposite side for engagement with the rim of the said coupling, the rim portion accommodating a release mechanism for selectively enabling and disabling a key retention mechanism of a lock within the device, the key retention mechanism having a key retention condition for trapping a key in the lock of the safety interlock device and a key releasable condition in which the key, when in the lock, can be removed, wherein the release mechanism comprises a primary release mechanism and a secondary latching mechanism, both being required to be moved and thus actuated by the spur of the coupling to disable the key retention mechanism for putting the key retention mechanism in the key releasable condition, the secondary latching mechanism being for resisting movement and thus actuation of the primary release mechanism by the spur of the coupling until it is actuated itself by the spur of the coupling.

2. The device of claim 1, wherein the device comprises a key releasably locked within it.

3. The device of claim 1, provided in combination with a key, wherein the key is released from the device but releasably lockable within the device.

4. The device of claim 1, wherein the secondary latching mechanism comprises a sprung member.

5. The device of claim 1, wherein the secondary latching mechanism is located such that it is engaged by the spur of the coupling before the primary release mechanism.

6. The device of claim 1, wherein the secondary latching mechanism comprises a sprung plate.

7. The device of claim 1, wherein the secondary latching member comprises a sprung plate that is indirectly acted upon by the spur.

8. The device of claim 1, wherein the secondary latching member comprises a captured ball bearing.

9. The device of claim 8, wherein the ball bearing is captured behind a hole in the wall of the spur portion.

10. The device of claim 1, wherein the secondary latching member comprises a split sprung plate, having two separately moveable components.

11. The device of claim 10, wherein only one of the movable components pushes down a release mechanism to release the primary release mechanism.

12. The device of claim 1, wherein the primary release mechanism is a pivotal release mechanism.

13. The device of claim 1, wherein the primary release mechanism is sprung into a non-releasing condition, thus ensuring the key is trapped until released.

14. The device of claim 1, wherein the primary release member has a latch on an underside of it.

15. The device of claim 1, wherein the primary release member has a latch on a projecting foot or extending member of the primary release member.

16. The device of claim 1, wherein the primary release member has a flange towards its rear for moving into or out of engagement or alignment with a stub of a rotatable member.

17. The device of claim 16, wherein the flange is moved upon actuation of the primary release member.

18. The device of claim 1, wherein the safety device has an outer casing and a key is arranged to operate an inner sleeve or inner element relative to the outer sleeve to close a port or window provided in the outer sleeve when the key is rotated into a key release condition.

19. The device of claim 18, wherein the inner element comprises a door.

20. A method of preventing a vehicle from being driven away from a loading bay during loading/unloading, comprising the sequential steps of:
applying to a vehicle at a loading bay a safety device which prevents the vehicle from being driven away from the loading bay;
locking the safety device to prevent removal of the safety device, by means of a key which is prevented from being removed from a lock of the safety device until the safety device is locked;
removing the key from the locked safety device; and
using the key to enable use of the loading bay, thus simultaneously trapping the key in a second interlock mechanism so that it cannot be used to unlock the safety device, the key remaining so trapped until it is used to disable use of the loading bay,
and wherein the safety device comprises a trapped key safety interlock device for use with a coupling that comprises a body provided with a face seal, a rim on one side and a projecting spur on the diametrically opposite side, the safety device including a coupling part which is complimentary to the said coupling and which comprises a body portion having a rim portion on one side for engagement with the spur of the said coupling and having a spur portion on the diametrically opposite side for engagement with the rim of the said coupling, the rim portion accommodating a release mechanism for selectively enabling and disabling a key retention mechanism of the lock within the device, the key retention mechanism having a key retention condition for trapping the key in the lock of the safety interlock device and a key releasable condition in which the key, when in the lock, can be removed, wherein the release mechanism comprises a primary release mechanism and a secondary latching mechanism, both being required to be moved and thus actuated by the spur of the coupling to disable the key retention mechanism for putting the key retention mechanism in the key releasable condition, the secondary latching mechanism being for resisting movement and thus actuation of the primary release mechanism by the spur of the coupling until it is actuated itself by the spur of the coupling.

* * * * *